United States Patent [19]

Altmann

[11] 4,058,710

[45] Nov. 15, 1977

[54] PROCESS FOR PREVENTING UNDESIRED CONTACT WITH LAND OR WATER BY LOW-FLYING AIRCRAFT

[75] Inventor: Helmut Altmann, Immenstaad, Germany

[73] Assignee: Dornier GmbH., Germany

[21] Appl. No.: 662,971

[22] Filed: Mar. 1, 1976

[30] Foreign Application Priority Data

Mar. 14, 1975 Germany ............................. 2511233

[51] Int. Cl.² ............................................. G06G 7/78
[52] U.S. Cl. .................................... 364/433; 244/180; 244/182; 244/183; 343/7 TA; 343/112 CA
[58] Field of Search ......................... 235/150.2, 150.25; 244/180, 182, 183; 343/7 TA, 112 CA

[56] References Cited

U.S. PATENT DOCUMENTS

| | | | |
|---|---|---|---|
| 3,530,465 | 9/1970 | Treffeisen et al. ............... | 343/7 TA |
| 3,948,096 | 4/1976 | Miller ............................. | 235/150.2 X |
| 3,958,218 | 5/1976 | Bateman ......................... | 235/150.2 X |
| 3,958,219 | 5/1976 | Bateman et al. ................ | 235/150.2 X |
| 3,988,713 | 10/1976 | Bateman ......................... | 235/150.2 X |

Primary Examiner—R. Stephen Dildine, Jr.
Attorney, Agent, or Firm—James E. Bryan

[57] ABSTRACT

This invention relates to a process for preventing undesired contact with land or water by low-flying aircraft which are assigned a minimum altitude and which are provided with instruments for measuring altitude, airspeed, angle of path, and transverse acceleration, comprising measuring the rate of descent ($\dot{H}$),
transverse acceleration ($b_Q$), when gravitational acceleration is eliminated,
and altitude (H) to thereby ascertain whether the aircraft is above a given limiting altitude ($H_{limit}$) determined from its ability for transverse acceleration and its flight data,
and correcting the aircraft by the maximum feasible transverse acceleration ($b_{Q\,max}$) when for a given measured value of altitude (H), the altitude is below the limiting altitude ($H_{limit}$).

6 Claims, 11 Drawing Figures

$$R_i = \frac{v^2}{b_{Qi}}$$
$$i = 1,2,3$$

$H_{LIMIT} - \Delta H_{min}$ v GIVEN AS PARAMETER

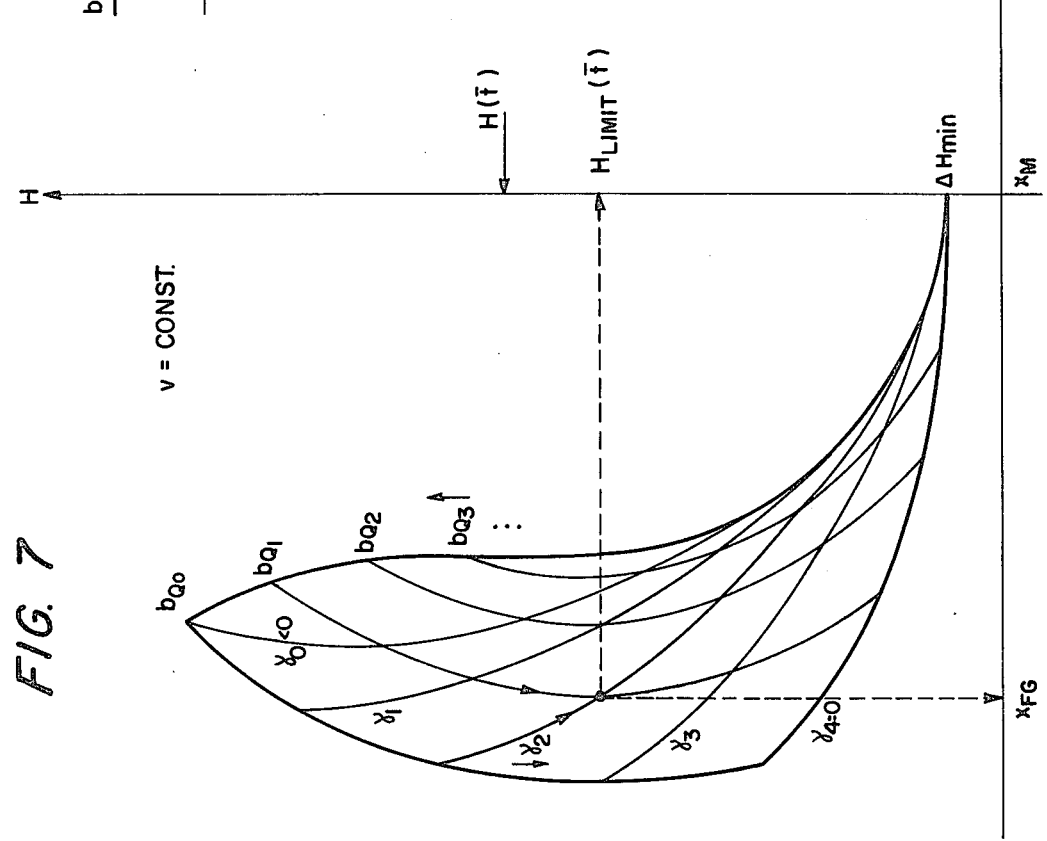
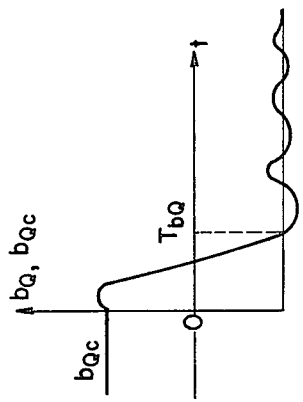
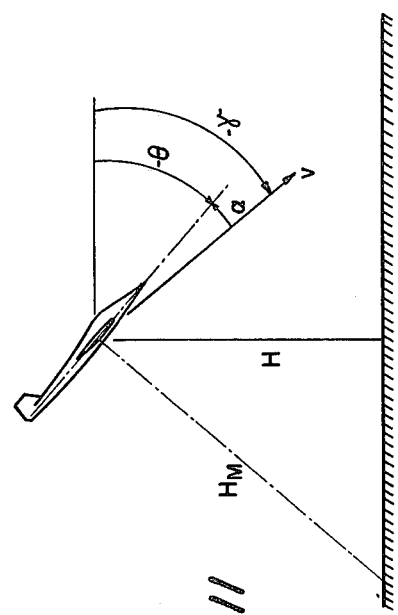
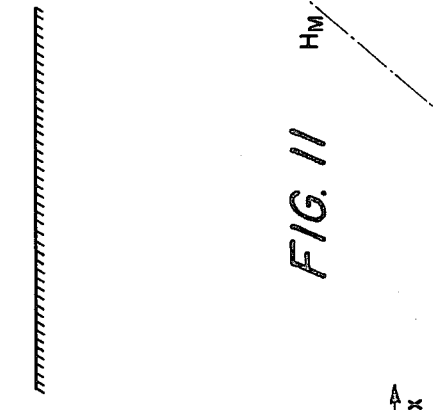
FIG. 7  FIG. 8  FIG. 9  FIG. 10  FIG. 11

PROCESS FOR PREVENTING UNDESIRED CONTACT WITH LAND OR WATER BY LOW-FLYING AIRCRAFT

The invention relates to a process for preventing undesired contact with land or water by low-flying aircraft, such as are prescribed a minimum altitude and are provided with measurement devices for altitude, rate of descent (or airspeed and path angle).

An alarm for detecting inadmissible rates of descent of an aircraft is known from German Offenlegungsschrift No. 2,139,075, when nearing the ground as a function of the height above the ground and of its time-derivative, the alarm comprising an altimeter measuring the height above ground and a differentiating component generating a rate-of-descent signal proportional to the derivative of the height above ground, and a limiting device restricting the amplitude of the rate-of-descent signal provided to avoid false alarms. The altitude of flight $h_T$ at which the alarm is triggered is determined from the equation:

$$h_T = -\dot{h}_T T_D + \dot{h}_T^2/2ng$$

where
- $\dot{h}_T$ is the rate-of-descent when the alarm is triggered ($\dot{h}_T = \dot{h}$)
- $T_D$ is the pilot's reaction time, plus a safety factor,
- $n$ is a constant and $g$ is gravity acceleration.

Since this alarm is lacking automatic actuation on the path control loop, it cannot be applied to unmanned aircraft.

The present invention addresses the problem of creating a process for preventing unwanted contact with land or water by low-flying aircraft when the minimum flight altitude depends upon the instantaneous flight parameters and on the possible subsequent path resulting therefrom.

Various process modes are provided to solve this problem in the manner of the invention. In all processes, a boundary or limiting altitude depending upon the maximum admissible transverse acceleration will be continuously determined from measurements of rate-of-descent (or from airspeed and path angle) and from the instantaneous transverse acceleration (with elimination of gravitational acceleration), the aircraft not being allowed to descend below the limiting altitude. If it descends lower, there will be a non-linear actuation on the path control loop in such manner that the aircraft path will be corrected at the maximum admissible transverse acceleration.

In one process, the invention calls for the limiting altitude to be tabulated as a function of the instantaneous transverse acceleration, of the airspeed, and of the path angle (or of the rate of descent), and to be stored in a computer, the data being provided from simulation or from test flights.

In another process, the invention determines the limiting altitude by the formula $$H_{limit} = -\dot{H} \cdot \frac{b_{QB} + b_Q}{b_{QB}} \cdot T_{bQ} + \frac{\dot{H}^2}{b_{QB}} + \Delta H_{min}$$

$b_{QB}$ is a reference acceleration (positive) which as a rule will be selected equal to the maximum transverse acceleration; $b_Q$ is the instantaneous transverse acceleration; $T_{bQ}$ is a time constant from the dynamics of the acceleration control loop of the aircraft; $\dot{H}$ is the rate of descent and $\Delta H_{min}$ is a predetermined minimum altitude. The term $\dot{H}^2/b_{QB}$ then corresponds to the expression $\dot{h}^2_T/(2ng)$ of German Offenlegungsschrift No. 2,139,075. The expression $$-\dot{H} \cdot \frac{b_{QB} + b_Q}{b_{QB}} \cdot T_{bQ}$$

is modified with respect to $-\dot{h} \cdot T_D$ of the Offenlegungsschrift. The fraction $$\frac{b_{QB} + b_Q}{b_{QB}}$$

takes into account that during the transition period until the maximum transverse acceleration, the influence of the acceleration in the desired direction will be the more prevalent the closer the value of $b_Q$ at the onset of the correction process was to $-b_{Qmax}$. Further, the origin of factor $T_{bQ}$ is different from that of $T_D$.

Another process of the invention applies to measurement methods in which the altitude is erroneous because determined normally to the longitudinal axis of the aircraft, as in laser beam methods. Denoting the erroneous measurement values for H and $\dot{H}$ (resp.) by $H_M$ and $\dot{H}_M$, the formulas for the limiting altitudes become $$H_{limit} = \frac{\dot{H}^2_M}{b_{QB}} - \dot{H}_M \cdot \frac{b_{QB} + b_Q}{b_{QB}} T_{bQ} + \Delta H_{min}.$$

Further advantages, characteristics and applications of the invention will be further illustrated in the accompanying drawings, in which:

FIGS. 4 through 7 are artist's renditions of the limiting trajectories;

FIGS. 8 and 9 show the impulse-response to transverse acceleration for a system of minimum phase and for one of a no minimum-phase ($b_{Qc}$ is the reference to transverse acceleration);

FIG. 10 elucidates some measurement variables; and

FIG. 11 is a sketch illustrating the measurement of altitude and of rate of descent by means of lasers.

The process of the invention is applied to prevent unwanted contact by aircraft with land or water. When applied over land, the assumption is flat terrain or small hills. This process also may be advantageously applied to maintain the altitude of aircraft, very swift change to new reference altitudes being especially feasible. Application thereof extends both to manned and unmanned aircraft.

Measuring instruments for the parameters below are located aboard an aircraft 2:

for altitude H, speed v, \
angle of path $\gamma$, } (or rate of descent $\dot{H}$)

and instantaneous transverse acceleration $b_Q$.

If with elimination of gravitational acceleration the aircraft moves in an arc of a circle at constant acceleration $b_Q$, then the loss in altitude will be given by $$\Delta H_{kin} = \frac{v^2}{-b_Q} \cdot (1 - \cos\gamma).$$

Figure 1:
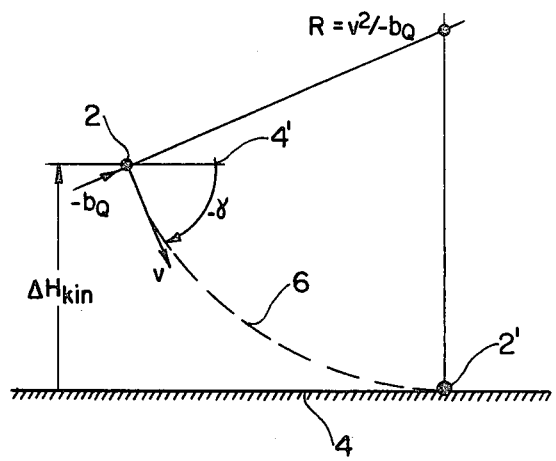
FIG. 1 is a sketch for determining the kinematic height.

The aircraft 2 in the position shown subtends an angle of path-$\gamma$ with respect to a horizontal reference line 4'. If aircraft 2 when flying along the arc of a circle 6, shown in dashed lines, comes to position 2; then its angle of path $\gamma$ will be zero. Reference line 4 represents the ground surface, or that of water. FIG. 1 clearly shows that the limiting altitude $H_{limit}$ always must be larger than $\Delta H_{kin}$ in order that contact with the ground be reliably avoided.

However, since topographical idiosyncracies must be accounted for, or the state of the water, the aircraft is predetermined to be at a minimum altitude $\Delta H_{min}$ which is to be heeded at all times for safety reasons.

Figure 2:
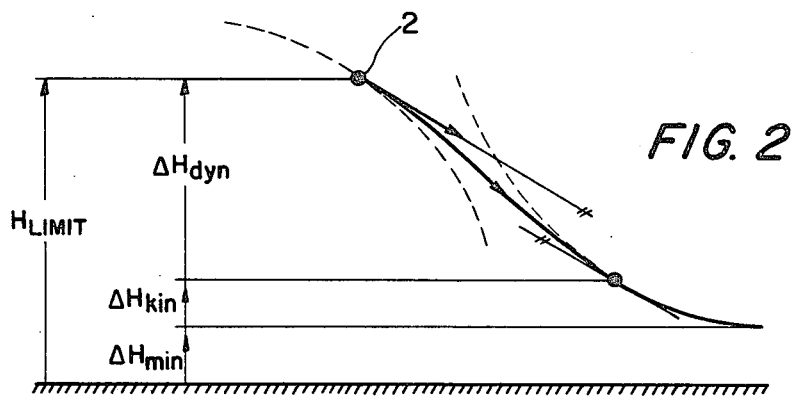
FIG. 2 shows the individual parameters of the limiting-altitude.

If the aircraft 2 at the beginning of the time under consideration has not yet acquired the transverse acceleration $b_Q = -b_{Qmax}$, then the limiting altitude $H_{limit}$ must be increased by a certain amount $\Delta H_{dyn}$, as shown in FIG. 2, because of the delay which occurs between the reference transverse acceleration $b_{QC} = (-b_{Qmax})$ and the actual transverse acceleration $b_Q$ (determined by the inertia of the aircraft), so that one will always have $$H \geq H_{limit} = \Delta H_{kin} + \Delta H_{dyn} + \Delta H_{min}$$

There will be continuous determination of $H_{limit}$ during flight and comparison with the actual altitude H.

For $H \geq H_{limit}$, the control 8 of the aircraft will remain unactuated, but for $H < H_{limit}$, a drive transverse acceleration will be imparted to the aircraft, the acceleration being $b_{QC} = -b_{Qmax}$.

Figure 3:
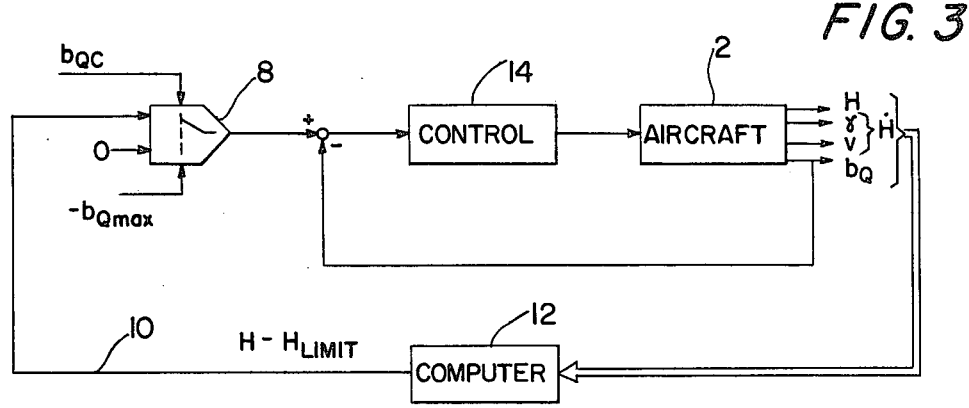
FIG. 3 is a control loop for dynamic path-limiting.

FIG. 3 shows a control loop 10 for dynamic path limiting. The values H, v, $b_Q$ and $\gamma$ (or H, $\dot H$ and $b_Q$) are measured inside the aircraft 2 and supplied to the computer 12 calculating $H - H_{limit}$. If the results show that the difference is larger or equal to zero, then the control 8 will remain inactive. If the difference is less than zero, then maximum transverse acceleration $-b_{Qmax}$ will be commanded. The regulator 14 for the transverse acceleration control loop may operate linearly or nonlinearly and will not be further described here.

Magnitude $\Delta H_{min}$ is predetermined in order to fix $H_{limit}$, and $\Delta H_{kin}$ may be determined from $$\Delta H_{kin} = \frac{v^2}{-b_Q} (1 - \cos\gamma)$$

The term $\Delta H_{dyn}$ determined by the dynamics can be obtained precisely only by continuous pre-computation. This requires solving a differential equation describing the relationship between the commanded reference transverse acceleration $b_{QC}$ and the future actual transverse acceleration $b_Q$. Further, one must obtain the relationship between $b_Q$ and the resulting rate of descent $\dot H$ (<0), from which one must obtain $$H_{dyn} = \int_{t}^{t + T_{dyn}} - \dot H \cdot d\zeta$$

where $\tau$ is the integration variable, $T_{dyn}$ the time interval until the commanded reference transverse acceleration $b_{QC}$ becomes $-b_{Qmax}$ within a given tolerance band of 5% of $b_{QC}$. If before reaching $b_Q = -b_{Qmax}$ the aircraft passes through the path minimum, then $\Delta H_{kin}$ drops out and $\Delta H_{dyn}$ becomes correspondingly smaller.

The continuous pre-computation of $\Delta H_{dyn}$ can be accomplished only at high computer cost. The designs described below as embodiments of the process on the other hand may be achieved at low computer cost.

In one embodiment of the process, the limiting flight paths of the aircraft are obtained by off-line simulation or by actual flight tests, as follows:

1. At the beginning of the computation ($t = t_o$) of each path a through g, let the angle of path always be $\gamma(t_o) = \gamma_o = 0$, let the initial speed $v_o = v(t_o)$ and the actual transverse acceleration $b_{Qo} = b_{Q(t_o)} \geq 0$ be parametrically predetermined.

Figure 4:
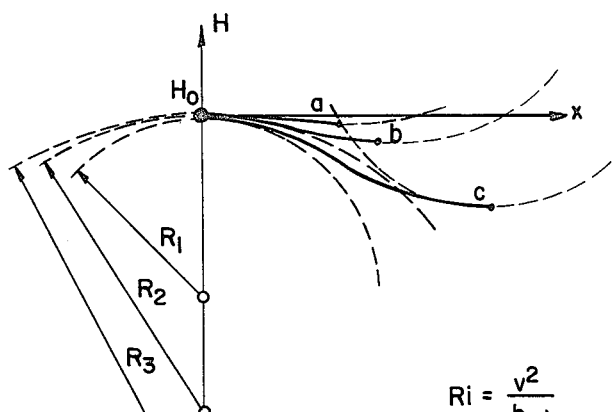

2. first let $b_{Qo}$ vary for fixed initial speed from $b_{Qo} = 0$ to $b_{Qo} = b_{Qmax}$, there being switching on of $$b_{QC} = -b_{Qmax}$$

when $t_A = t_o$ (FIG. 4).

Figure 5:
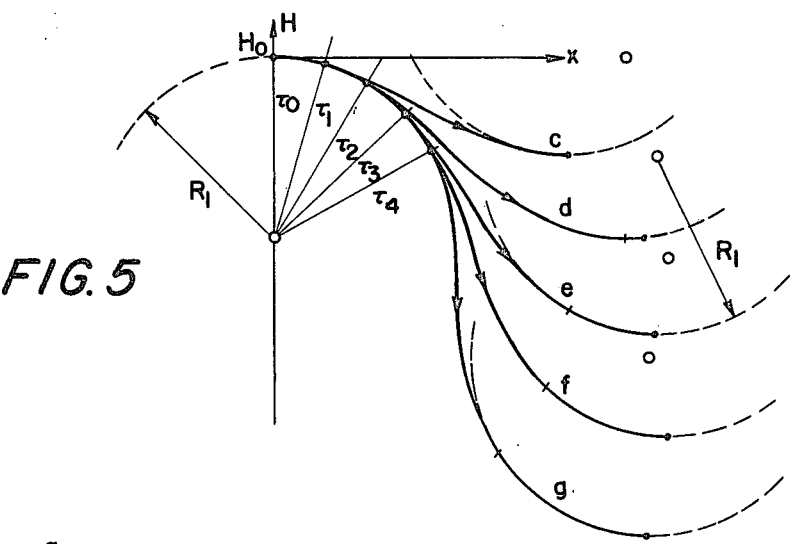

3. then the switch-on time $t_A + t_o + \tau$ — with $\tau \geq 0$ — will be varied for $\gamma_o = 0$ and $b_{Qo} = b_{Qmax}$, $\tau_{max}$ being determined by $\gamma_o \geq \gamma > -90°$ (FIG. 5).

4. The paths will be so computed until $\gamma = 0$ again (path minimum) and thereupon all paths (a through g) will be so shifted that their path minima coincide (FIG. 6).

5. The same process subsequently will be carried out for various initial speeds $v_o$.

Figure 6:
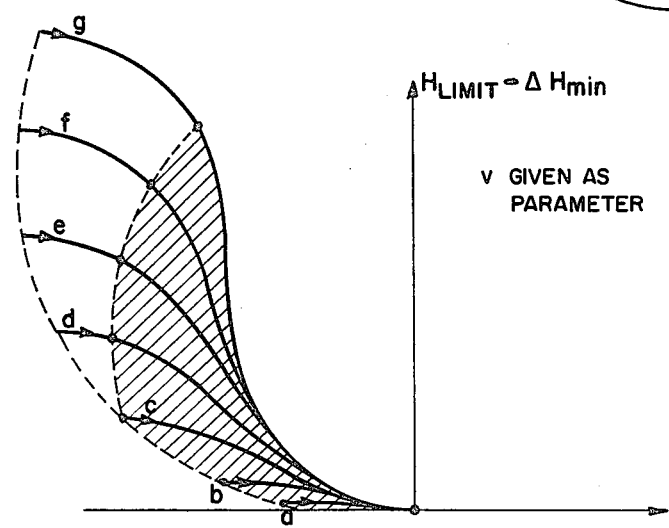

Each point within the shaded "region of danger" in FIG. 6 is uniquely determined by the values $H_{limit}$, v, $b_Q$ and $\gamma$, as shown by the lines $\gamma = $ constant and $b_Q = $ constant (FIG. 7), so that the measurement of v, $b_Q$ and $\gamma$, (and hence)

$$H_{limit} = H_{limit}(v, b_Q, \gamma)$$

may be uniquely determined. The points ($H_{limit}$, v, $b_Q$, $\gamma$) as a rule being discrete, $H_{limit}$ will be determined by interpolation or by postulating the particular most unfavorable boundary values for v, $b_Q$ and $\gamma$.

In actual design, a table with input values of v, $b_Q$ and $\gamma$ and of the associated resulting value $H_{limit}$ will be stored in the computer memory. The corresponding analog representation is qualitatively shown in FIG. 7. The latter illustrates the case of the aircraft at time $t = \bar t$ being in the mode $b_Q(\bar t) = b_{Q1}$, $\gamma(\bar t) = \gamma_2$, v and $H(\bar t)$.

FIG. 7 shows a graph with $\gamma = $ constant and $b_Q = $ constant, and allows obtaining $H_{limit}(\bar t)$ and the horizontal distance $x_M - x_{FG}$ to the path minimum. In the example shown, $H > H_{limit}$, that is, the path control loop will not be activated. If the aircraft maintains the value of $b_Q$, its path will be increasingly steeper, whereby the drawn-in point along the $b_Q = b_{Q1}$ wanders upwardly until $H = H_{limit}$. Because of the ensuing activation (of the control loop) the aircraft will move along a limit trajectory ($H = H_{limit}$) as far as the path minimum, where the control loop again will switch over to normal operation.

This process may be simplified because the limit trajectories are determined only for the most unfavorable value of speed v, that is, for that value of v (within the admissible range) entailing the least maneuverability of the aircraft. In lieu of v and $\gamma$, one may introduce $\dot H$ as a parameter, so that now $$H_{limit} = H_{limit}(\dot{H}, b_Q).$$

The limit altitude so obtained however will always be larger than in the preceding version of the process, so that activation of path control will occur prematurely.

In another mode of the process, the dynamic component of the limit altitude, $\Delta H_{dyn}$, is obtained as an estimate. This includes the system response to an impulse function from the commanded transverse acceleration from $b_{QC} = +b_{Qmax}$ to $-b_{Qmax}$, where $b_Q = b_{QC} = b_{Qmax}$ prior to the impulse. The time $T_{bQ}$ denotes the interval to reaching for the first time the value $b_Q = -b_{Qmax}$ (see FIGS. 8 and 9). FIG. 8 shows the acceleration for a minimum-phase system (canard type planes) and FIG. 9 shows the acceleration for a non-minimum phase system (tail-engine driven aircraft).

Given that $$\dot{H} = v \sin \gamma,$$

the dynamic component of limit altitude approximately is obtained from $$\Delta H_{dyn} = -\dot{H} \cdot \frac{b_{QB} + b_Q}{b_{QB}} \cdot T_{bQ}$$

where, if a larger value of $T_{bQ}$ is inserted, allowance can be made for a safety factor. The limit altitude $H_{limit}$ then will be given by $$H_{limit} = \Delta H_{kin} + \Delta H_{dyn} + \Delta H_{min}.$$

Measurement of altitude and of rate of descent may be effected by radio means or by barometric altimeters.

FIG. 10 provides the relationship $$\theta = \alpha + \gamma$$

where $\theta$ is the angle of position of the aircraft with respect to a geodesic reference line and $\alpha$ the angle of attack of the aircraft 2. The altitude H and rate of change in altitude $\dot{H}$ for barometric altimetry may be carried out independently of the angle of position $\theta$ within certain limits (approx. $\pm 30°$).

Using suitable estimates and approximation formulas, one may then obtain $$\Delta H_{kin} (\text{with } \Delta H_{dyn} = -\dot{H} \cdot \frac{b_{QB} + b_Q}{b_{QB}} \cdot T_{bQ}; \dot{H}<0),$$

without having to know $\gamma$, $\alpha$ or $\theta$.

$$\dot{H} = v \cdot \sin \gamma$$

$$\Delta H_{kin} = \frac{\dot{H}^2 (1 - \cos \gamma)}{-b_Q \cdot \sin^2 \gamma} = \frac{-\dot{H}^2}{2 \cdot b_Q \cdot \cos^2 \frac{\gamma}{2}}$$

$$\Delta H_{kin} < \frac{\dot{H}^2}{b_Q} = H^*_{kin} \text{ for } |\gamma| \leq 90°$$

whence $$H_{limit} < H^*_{limit} = \frac{\dot{H}^2}{b_{QB}} - \dot{H} \cdot \frac{b_{QB} + b_Q}{b_{QB}} T_{bQ} + \Delta H_{min}$$

for $\dot{H} \leq 0$.

$H_{limit}$ will be used in the control loop of FIG. 3.

In a further embodiment of the process, the measuring instrument will sense H and $\dot{H}$ normal to the longitudinal axis of the aircraft, for instance by laser methods (FIG. 11). If $\theta \neq 0°$, this will cause spurious effects, because then $$H_M = \frac{H}{\cos \theta}$$

$$\dot{H}_M = \frac{\dot{H}}{\cos \theta}$$

hence $$H_M \geq \frac{H_{limit}}{\cos \theta} = \frac{\Delta H_{dyn}}{\cos \theta} + \frac{\Delta H_{kin}}{\cos \theta} + \frac{\Delta H_{min}}{\cos \theta}$$

In particular $$\Delta H_{dyn} = -\dot{H} \cdot T_{bQ}, \dot{H} \leq 0,$$

$$\Delta H_{kin} = \frac{\dot{H}^2}{2 b_{QB} \cos^2 \frac{\gamma}{2}}$$

$$H_M = \frac{H}{\cos \theta}, \dot{H}_M = \frac{\dot{H}}{\cos \theta},$$

$$\frac{\Delta H_{dyn}}{\cos \theta} = -\dot{H}_M \cdot \frac{b_{QB} + b_Q}{b_{QB}} T_{bQ}$$

and $$\frac{\Delta H_{kin}}{\cos \theta} = \frac{\dot{H}_M^2 \cdot \cos \theta}{2 b_{QB} \cdot \cos^2 \frac{\gamma}{2}} < \frac{\dot{H}_M^2}{b_{QB}}, \gamma < \frac{\pi}{2}.$$

The magnitude of $\Delta H_{min}$ for $\dot{H} \to 0$ or $H_{limit}$ will be of maximum weight because in that case $H_{dyn} \to 0$ and also $H_{kin} \to 0$. In order not to introduce spurious effects in $\Delta H_{min}$ for horizontal flight, the expression $\Delta H_{min}/\cos \theta$ is therefore replaced by $\Delta H_{min}$ and therefore $I_{bQ}$ is increased by a sufficient amount so that within the range of values for $\dot{H}$ that is of interest, the actual limiting altitude will always be less than the computed one. One obtains therefore the formula:

$$H_{limit} < H^*_{limit} = \frac{\dot{H}_M^2}{b_{QB}} - \dot{H}_M \cdot \frac{b_{QB} + b_Q}{b_{QB}} T_{bQ} + \Delta H_{min}.$$

It will be obvious to those skilled in the art that many modifications may be made within the scope of the present invention without departing from the spirit thereof, and the invention includes all such modifications.

What is claimed is:

1. A process for preventing undesired contact with land or water by low-flying aircraft which are assigned a minimum altitude and which are provided with instruments for measuring the flight data, i.e., altitude, airspeed, angle of path, and transverse acceleration ($b_Q$), when gravitational acceleration is eliminated,
   comprising measuring the rate of descent ($\dot{H}$),
   and altitude to (H) compute a limiting altitude ($H_{limit}$) determined from its ability for transverse acceleration and its other flight data,
   and controlling the aircraft by means of an automatic feedback controller which provides the aircraft with the maximum feasible transverse acceleration ($b_{Qmax}$) when for a measured value of altitude (H), the altitude is below the limiting altitude ($H_{limit}$).

2. A process according to claim 1 including computing the limiting altitude $H_{limit}$ by adding a kinematic altitude ($\Delta H_{kin}$) a dynamic altitude ($\Delta H_{dyn}$), and a predetermined minimum altitude ($\Delta H_{min}$), the kinematic altitude being given by the formula $$\Delta H_{kin} = \frac{v^2}{-b_Q} \cdot (1 - \cos \gamma)$$

and the dynamic altitude being obtained by continuous pre-computation of the relationship $\ddot{H} = \ddot{H}(b_Q(t), t) = \ddot{H}(t)$ and subsequent integration of $\ddot{H}$ over time $\tau$:

$$H_{dyn} = \int_t^{t + T_{dyn}} -\ddot{H} \, d\zeta$$

where $T_{dyn}$ is the time interval unit reaching the commanded reference transverse acceleration ($b_{QC} = -b_{Qmax}$) within a given tolerance band of 5% of $b_{QC}$.

3. A process according to claim 2 in which for simplifying the determination of the formula for $H_{limit}$, the following equation derived by an extreme case estimation is used:

$$H_{limit} = \frac{\dot{H}^2}{b_{QB}} - \dot{H} \frac{b_{QB} + b_Q}{b_{QB}} \cdot T_{bQ} + \Delta H_{min}, \dot{H} \leq 0$$

4. A process according to claim 1 in which the flight data used for computing $H_{limit}$ are transverse acceleration $b_Q$, speed $v$, and angle of path $\gamma$.

5. A process according to claim 1 in which the flight data used for computing $H_{limit}$ are transverse acceleration $b_Q$ and rate of descent ($\dot{H}$).

6. A process according to claim 8 including determining the limit trajectories of the aircraft by simulation or test flights for the purpose of obtaining the limiting altitude ($H_{limit}$), the angle of path $\gamma(t_o) = \gamma_o = 0$, the initial speed $v(t_o) = v$ and the actual transverse acceleration $b_{Qo} = b_Q(t_o) \geq 0$ for $t = t_o$, there being first a variation of the transverse acceleration from $b_{Qo}$ to $b_{max}$ keeping the initial speed $v_o$ constant, $b_{QC} = b_{max}$ being applied each time $t_A = t_o$, thereupon for $\gamma_o = 0$ and $b_{Qmax}$ the turn-on time $t_A = t_o + \tau$ (where $\tau \geq 0$ is the parameter) will be varied for $b_{QC} = -b_{Qmax}$, where $\tau_{max}$ is determined by $\gamma_o \geq \gamma > -90°$, the paths being computed until $\gamma = 0$ again (path minimum), and then all paths will be so shifted that their minima will coincide, whereupon the foregoing process steps will be carried out either for the various initial speeds $v_o$ or only once for the most adverse value $v_o$, so that a diagram of the limit trajectories will show an area which is the "danger domain" for the aircraft and within which each point is uniquely determined by the values H, $v$, $b_Q$, and $\gamma$, so that measurement of $v$, $b_Q$, and $\gamma$ will uniquely determine $$H_{limit} = H_{limit}(v, b_Q, \gamma).$$

* * * * *

UNITED STATES PATENT OFFICE
CERTIFICATE OF CORRECTION

Patent No. 4,058,710    Dated November 15, 1977

Inventor(s)  Helmut Altmann

It is certified that error appears in the above-identified patent and that said Letters Patent are hereby corrected as shown below:

Column 1, line 23, the equation should read as follows:

$$--- \dot{h}_T = -\dot{h}_T \cdot T_D + \dot{h}_T^{\,2}/2ng ---.$$

Column 5, line 66, "$H_{limit}$" should read $--- H^*_{limit} ---$.

Column 6, line 39, "$I_{bQ}$" should read $--- T_{bQ} ---$.

Column 7, line 17, after "of", "H" should read $--- \dot{H} ---$.

Column 8, line 6, "(H)" should read $--- (\dot{H}) ---$. Line 7, "claim 8" should read $---$ claim 1 $---$.

Original claim 7, allowed by the Examiner in Paper No. 6, dated June 1, 1977, has been omitted from the patent and is to be inserted therein as follows:

7. A process according to claim 1 in which the aircraft altitude is measured normal to the longitudinal axis thereof, the limiting altitude being given by $$H_{limit} = \frac{\dot{H}_M^{\,2}}{b_{QB}} - \dot{H}_M \frac{b_{QB} + b_Q}{b_{QB}} T_{bQ} + \triangle H_{min}$$

UNITED STATES PATENT OFFICE
CERTIFICATE OF CORRECTION

Patent No. 4,058,710          Dated November 15, 1977

Inventor(s) Helmut Altmann

It is certified that error appears in the above-identified patent and that said Letters Patent are hereby corrected as shown below:

CONTINUED:

where $\dot{H}_M = \dfrac{\dot{H}}{\cos \theta}$ and where $\theta$ represents the measured pitch angle of the aircraft with respect to a geodesic reference line.

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*